United States Patent [19]

Regehr

[11] Patent Number: 5,454,059
[45] Date of Patent: Sep. 26, 1995

[54] EVAPORATION CONTROL ADAPTOR SLEEVE FOR VAPORIZER ELECTRODE

[76] Inventor: Martin W. Regehr, 2330 E. Del Mar Blvd. #309, Padadena, Calif. 91107

[21] Appl. No.: 136,875

[22] Filed: Oct. 18, 1993

[51] Int. Cl.[6] .............................. F22B 1/30; H05B 3/60; F24H 1/20
[52] U.S. Cl. ...................................................... 392/334
[58] Field of Search ................................... 392/329, 330, 392/334

[56] References Cited

U.S. PATENT DOCUMENTS

| | | | |
|---|---|---|---|
| 1,981,765 | 11/1934 | Weiss | 422/305 |
| 2,572,536 | 10/1951 | Tatem . | |
| 2,621,281 | 12/1952 | Runkle | 392/337 |
| 3,308,267 | 3/1967 | Fenstermaker . | |
| 3,714,391 | 1/1973 | Katzman et al. | 392/337 |
| 3,714,392 | 1/1973 | Katzman et al. | 392/337 |
| 3,877,360 | 4/1975 | Vigerstrom | 392/337 |
| 4,205,222 | 5/1980 | Williams . | |

FOREIGN PATENT DOCUMENTS

| | | | |
|---|---|---|---|
| 106275 | 1/1939 | Australia | 392/330 |
| 1166296 | 4/1984 | Canada . | |
| 521433 | 7/1976 | U.S.S.R. | 392/330 |
| 1313473 | 5/1987 | U.S.S.R. . | |

*Primary Examiner*—John A. Jeffery

[57] ABSTRACT

A simple and inexpensive adaptor is provided for a commonly used household vaporizer to reduce and control its rate of vaporization. A thin insulating sleeve or tube is placed around one or more of the electrodes to lengthen the path of the current so as to reduce its strength, and thus the rate of vaporization, whenever the hardness of the water supply is too high. By selecting the proper length of tube, or a tube with the proper size of perforations, the current strength is easily adapted by the user to the water hardness to produce the desired evaporation rate.

"Also, for clarity's sake, in the disclosure and claims, the term 'to adjust the adapter sleeve' means a one-time or occasional change of its length while the vaporizer is not operating, as clearly distinct from any continual variation during the operation of the device."

"Similarly, the term 'elastic' as applied to the sleeve means that its material is an elastomer and therefore easily stretchable and thereafter will tend to resume its former shape, as opposed to an only flexible, but not stretchable material."

3 Claims, 4 Drawing Sheets

5,454,059

EVAPORATION CONTROL ADAPTOR SLEEVE FOR VAPORIZER ELECTRODE

FIELD OF THE INVENTION

This invention relates to domestic vaporizers in which electric current flows through water between two electrodes and generates steam in order to raise the humidity of the surrounding air.

BACKGROUND OF THE INVENTION

Vaporizers are used in numerous households in the country. They are inexpensive and reliable. However, as the hardness of the water varies from one locality to the next, so does its conductivity and the rate of vaporization. If the water is too hard, the electric current is too high, and the vaporizer malfunctions. The symptoms of this malfunction include premature depletion of the water reservoir, and spraying of hot liquid water from the steam outlet. The remedy currently recommended by manufacturers is dilution of the local tap water with distilled water, which reduces the conductivity. This solution is inconvenient and expensive.

The above problem has been known for a long time and several patents have been granted for solutions. Many patents propose to increase the current path between the electrodes of the vaporizer in order to increase the total resistance between them and thus to reduce the vaporization rate. In U.S. Pat. Nos. 3,308,267 to Fenstennaker, and 4,205,222 to Williams, and also in Canadian patent 1,166,296 to Howard-Leicester, it is suggested that the current path be lengthened by interposing plastic insulating components between the electrodes. In the most sophisticated of these three patents, Williams proposes to equip his boiler with a movable insulating sleeve 17, interposed between electrode 8 and counter-electrode 10, in order to vary the current path, as shown in FIG. 1 of the patent.

No doubt, each of the proposed solutions will work in the environment for which the device is designed, but none of them responds to the needs of a typical household user. The Williams apparatus, for instance, is much too complicated and expensive. The Fenstermaker vaporizer is simple and inexpensive, but it can not easily be adjusted to the needs of the individual user. His insulating strip 23, which lengthens the current path between electrodes 20 and 21, is permanently fixed to electrode 21 at the factory.

BRIEF SUMMARY OF THE INVENTION

This invention solves the problem of the prior art vaporizer, outlined above, by providing a simple and inexpensive adaptor for reducing and limiting the current through the vaporizer to a desired value. In all embodiments of the invention, the adaptor takes the form of a tubular or sleeve-like insulating member placed to surround at least one of the electrodes such that it will restrict and control the direction and magnitude of the current flowing between the electrodes.

In the several disclosed embodiments, the insulating members differ in shape and have different mechanical and structural features. The adapter may be a semi-rigid tube or a flexible elastic sleeve placed on at least one electrode, or it may be an insulating cylinder having numerous perforations distributed over its wall to permit controlled current flow through the perforations in the wall to and from the electrode inside the cylinder. A most important aspect of the present invention is the fact that it provides an adaptor which can easily be installed by the user of the appliance, exchanged or adapted in size, if necessary, to obtain a particular desired level of evaporation, having regard to the hardness of the available water supply.

The proposed invention will work only if the available water supply is too hard, resulting in excessive current and evaporation. If, on the contrary, the water is too soft, the present invention is not applicable.

DETAILED DESCRIPTION OF THE INVENTION

Figure 1:
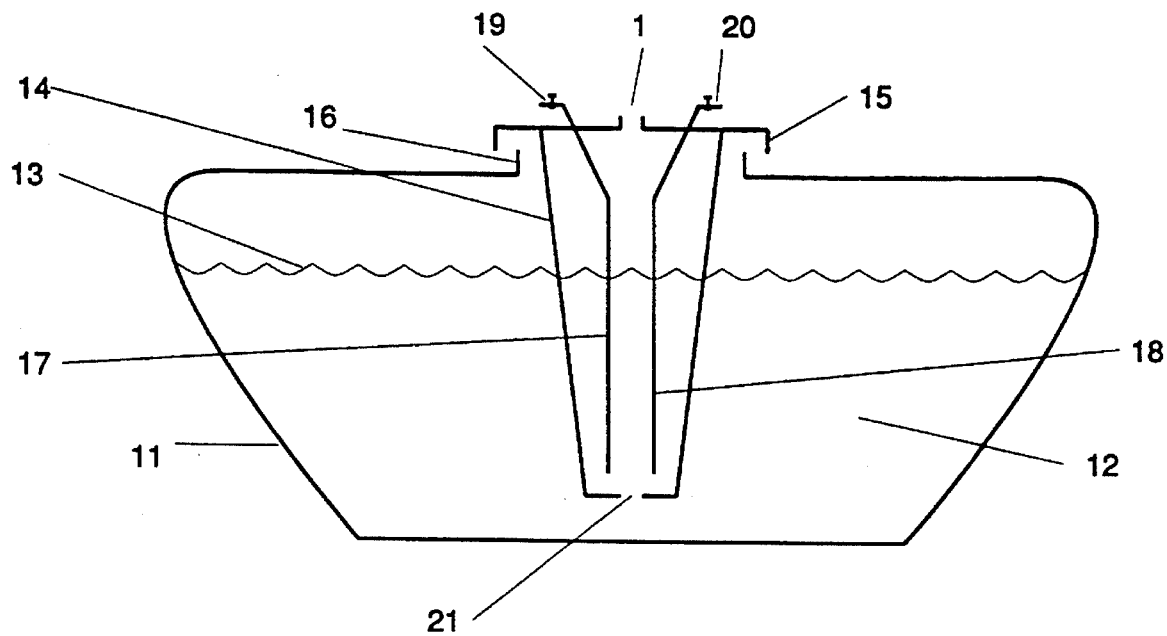
FIG. 1 is a schematic elevational view, partly in section, of a common household vaporizer.

FIG. 1 illustrates a conventional household vaporizer which consists of a reservoir 11, containing a vaporizable liquid 12, the level 13 of which will drop due to evaporation. The vaporization takes place in the vaporization chamber 14 which is supported by its cap 15 on the neck 16 at the top of the reservoir. The cap and vaporization chamber are fastened together by means of screws. Within the vaporization chamber, two electrodes 17 and 18 are suspended from cap 15, where they are connected to respective electric terminals 19 and 20, which in turn may be connected to a household current supply in a well known manner. The chamber 14 has at the bottom a liquid inlet 21 and at the top a steam outlet 1. Because of the inlet 21, the liquid level within the chamber 14 is the same as outside in the reservoir 11. The liquid 12 is usually tap water, but it could contain medicinal or other additives. Thus the term "liquid" encompasses tap water as well as any other suitable aqueous solutions. When current is passed between electrodes, the heat generated in the vaporizer chamber generates steam which exits through outlet 1.

Figure 3:
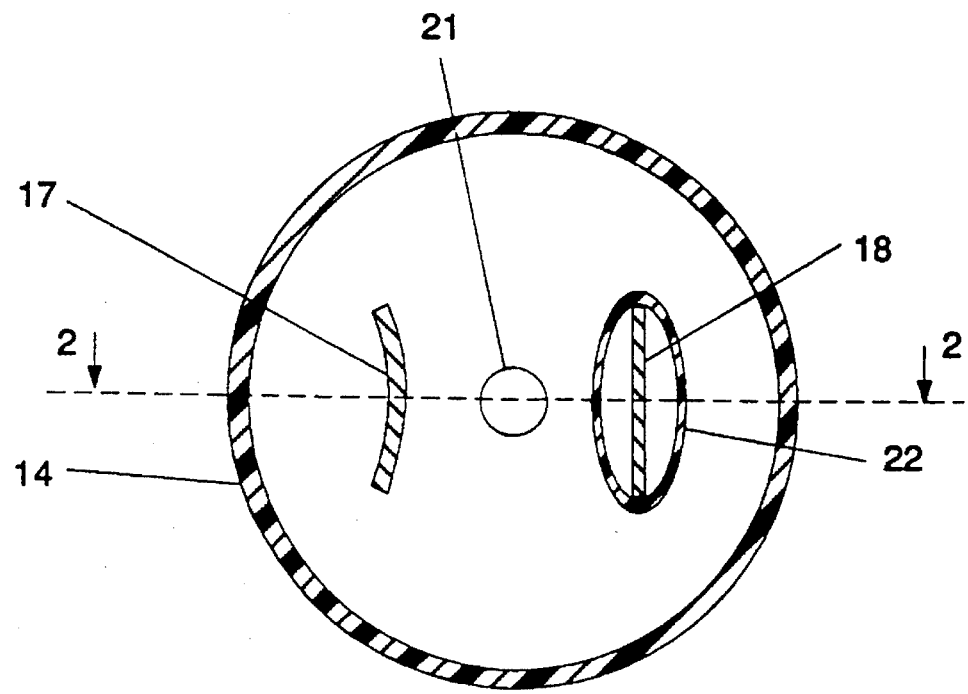
FIG. 3 is a horizontal sectional view taken along line 3—3 of the FIG. 2.

The electrodes may be flat or slightly curved to improve their rigidity, as is known in the prior art, and illustrated at 17 in FIG. 3.

Figure 2:
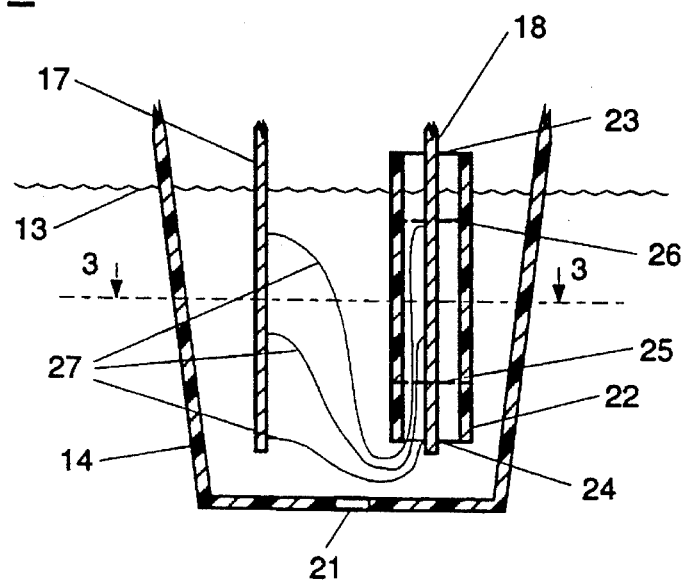
FIG. 2 is a vertical sectional view of the vaporizer chamber of the first and preferred embodiment along line 2—2 of FIG. 3 with the novel adaptor installed on one of the electrodes.

FIGS. 2 and 3 illustrate the first and preferred embodiment of the invention. The novel adaptor 22 is placed on electrode 18, within the vaporizer chamber 14. The adaptor is a piece of a fairly thin semirigid insulating tube. Its diameter is chosen to be slightly smaller than the width of the essentially flat metal electrode 18, so that the tube must be deformed slightly, as shown in FIG. 3, to be fitted over the electrode. The compression produced by this deformation causes the tubing to remain in place on the electrode.

Without the adaptor 22, the current path between electrodes 17 and 18 would be very short and very wide, resulting in maximum current flow. Due to the adaptor, however, most of the current to and from electrode 18 must travel a much longer and narrower path up and down inside the adaptor, as shown at 27, before it reaches the bottom end 24 of the tube 22, from where it can proceed across to the other electrode. Thus, depending on the dimensions of the adaptor, it can reduce the total current flow quite substantially.

If it is desired to increase the current, the adaptor may be shortened by cutting it at line 25, for instance. This will decrease the effective length of the path and its resistance. Conversely, the lengthening of the adaptor by adding a piece of tubing or by replacing it with a longer tube will reduce the current and the vaporization rate. The adaptor may be assembled of several coaxial sections of tubing of different lengths to obtain the desired result.

The unique advantage of the present invention is therefore that it offers every user a very simple means to adapt the operation of his vaporizer to his personal needs and to the hardness of his water supply. He may do that by trial and error. He may keep on hand several different lengths of the tubing, or one longer piece of tubing to be cut into shorter pieces, as required. The local vendor selling the appliance may suggest what length may be the most suitable.

In FIG. 2, the top end 23 of the adaptor is shown to protrude above the surface of the liquid, which is the preferred arrangement. The vaporizer will also function if the top end of the adaptor is submerged below the liquid surface, as at 26, but then, when the liquid level drops below line 26, the top branch of the current path will be cut off. This may produce an undesirable abrupt change in the rate of current flow and evaporation. No such abrupt change will occur if the current flows always only through the bottom of the adaptor, as in FIG. 2.

FIG. 3, being a cross-sectional view of FIG. 2, shows that the shape of the normally round tube is slightly deformed to an oval shape to be placed on the electrode and is held thereon by slightly pressing inward against the edges of the electrode.

Figure 4:
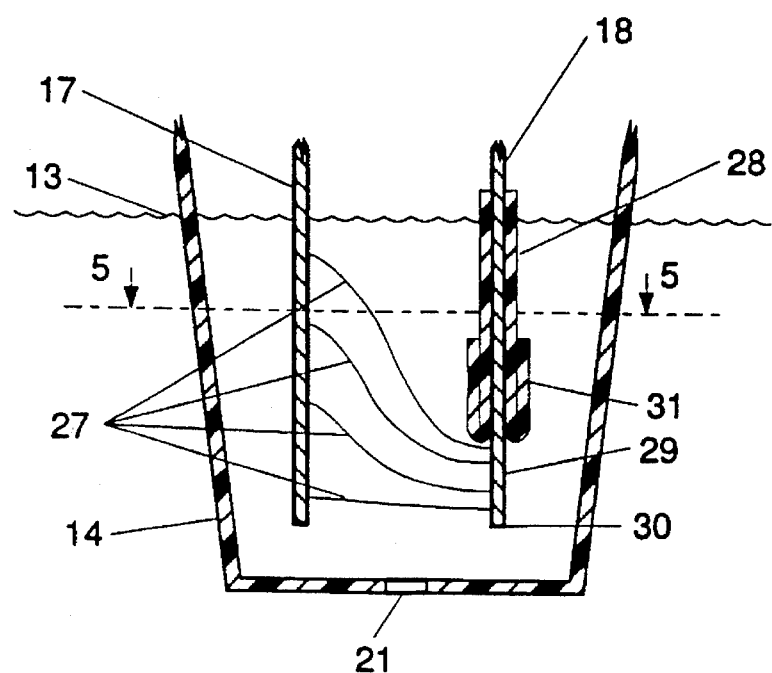
FIG. 4 illustrates a vertical sectional view of another embodiment along line 4—4 of FIG. 5.
Figure 5:
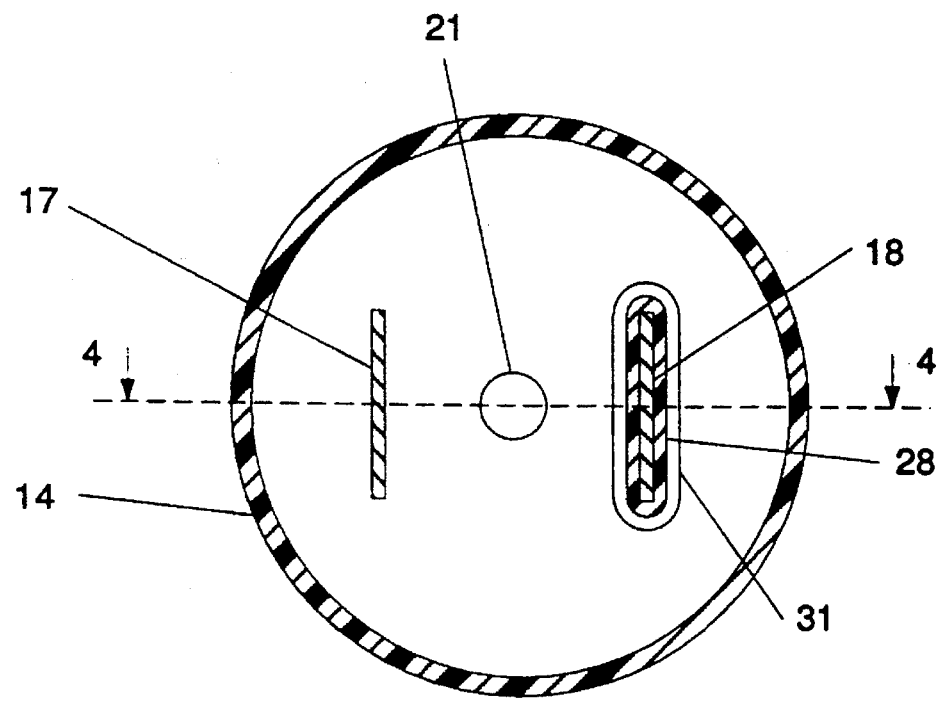
FIG. 5 is a horizontal cross-sectional view along line 5—5 of FIG. 4

In FIG. 4 and FIG. 5, the adaptor takes the form of a thin soft elastic sleeve 28, which must be stretched somewhat to be slipped onto the electrode 18. Since the sleeve 28 is in full contact with the electrode 18, there is no free space and no current flow between the two, as there was in the preceding embodiment. However, by covering a certain upper portion of the electrode by sleeve 28, this portion is excluded from current conduction, so that current can flow only to and from the uncovered or bare lower portion 29 of the electrode 18. By varying the size and arrangement of sleeve 28, the dimension of the lower bare portion can be varied as desired. If the bare portion 29 of the electrode were very small or nil, i.e. if the sleeve would cover the electrode 18 completely to its bottom end 30, then the total current conducted would be also very small or almost nil. On the other hand, if at least a substantial lower part of the electrode is bare, then the total current will be somewhere between nil and a maximum. Thus, by trial and error, the user may adjust his adaptor to obtain the desired evaporation rate.

To increase evaporation, he may increase the bare portion by cutting a piece off the lower end of the sleeve. Alternatively, instead of cutting, the lower end of the elastic sleeve may be turned over on itself and pulled up, as shown at 31 in FIG. 4. Conversely, this end may be lowered to decrease the bare portion.

In this embodiment, again, the upper end of sleeve 28 protrudes above the surface of the liquid.

Figure 6:
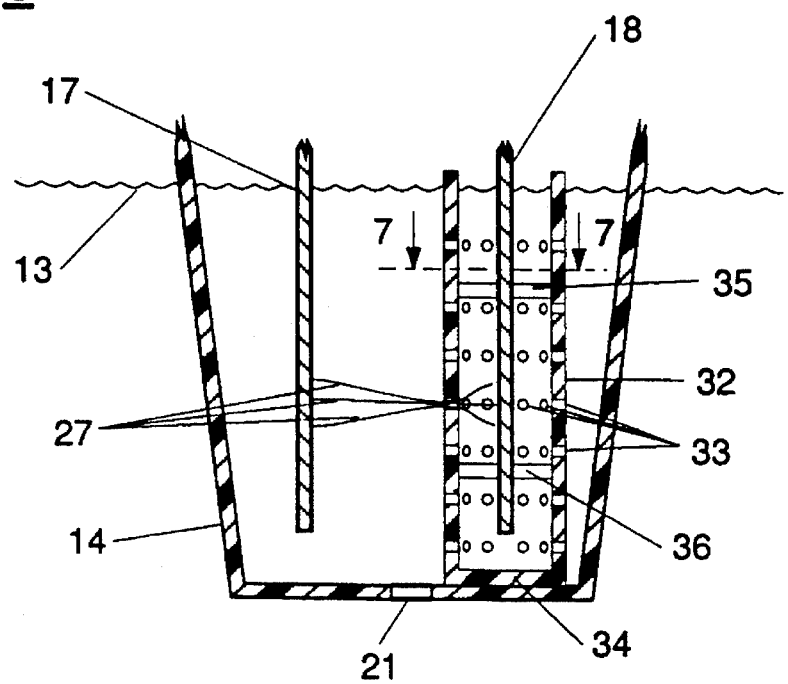
FIG. 6 is a vertical sectional view of a third embodiment of the invention.

In FIG. 6, illustrating the third embodiment of the invention, the adaptor consists again of a rigid or semi-rigid insulating tubular member 32, which is surrounding the electrode 18 within the vaporization chamber 14. In this tubular member, however, the wall is perforated as shown at 33. These perforations will reduce the current flow depending on their size and number. They may be distributed evenly over the whole surface of the member 32, or be limited to a portion or a side of the member, either to the side facing the opposite electrode 17, or to any other side. The perforations may be larger or more numerous on some portion of the tube than on some other portion at a different height along the tube; this will cause the rate of evaporation to change with time in a different manner than if the perforations were uniform over the tube. For example, it may be desirable to begin with a high rate of evaporation to elevate the room humidity quickly, and then to continue at a lower rate of evaporation sufficient to maintain the room humidity. This can be accomplished with a tube having larger, and/or more, perforations per unit surface area near the top of the tube than near the bottom. To restrict the current to the perforations only (as shown at 27), the top of the tube 32 again protrudes above the liquid surface 13, while its lower end is closed by an integral bottom 34 as shown in FIG. 6. On the other hand, this integral bottom may be omitted if the lower edge of tube 32 is straight and fits closely on the flat bottom of vaporization chamber 14.

In this embodiment, the perforated member 32 could be free-standing. If its inner diameter is not much larger than the width of the electrode 18, then it cannot move very much laterally with respect to the electrode. Preferably, however, it is supported immovably with respect to the electrode to stabilize the current path.

In FIG. 6 numerals 35 and 36 indicate two identical rigid supports or spacers centering electrode 18 within adaptor 32 and holding the two substantially immovably with respect to each other. As can be seen from FIG. 7, support or spacer 35 is a narrow, flat strip of insulating material, extending between opposite inside walls of adaptor 32 and having at its centre an elongated slot 37 to accommodate the electrode 18. Spacer 35 may be firmly attached to the wall of the adaptor, such as by gluing, in which case it will not be attached to the electrode but have a small clearance between slot 37 and the electrode for easy insertion or removal of the latter. On the other hand, the spacer 35 may be firmly attached to the electrode, such as by friction or some simple snap-on arrangement, in which case the spacer will not be attached to the adaptor wall, but due to a small clearance therebetween, will slide easily parallel to the wall when the electrode—spacer combination is inserted or removed from the adaptor.

The construction of the lower spacer 36 is identical to, and aligned with, spacer 35. More than two spacers could be used, but for most applications two should be enough. Care must be taken that the width of spacers 35 and 36 is not too large, so as not to obstruct unduly the upward movement of the steam generated within the adaptor 32.

Figure 7:
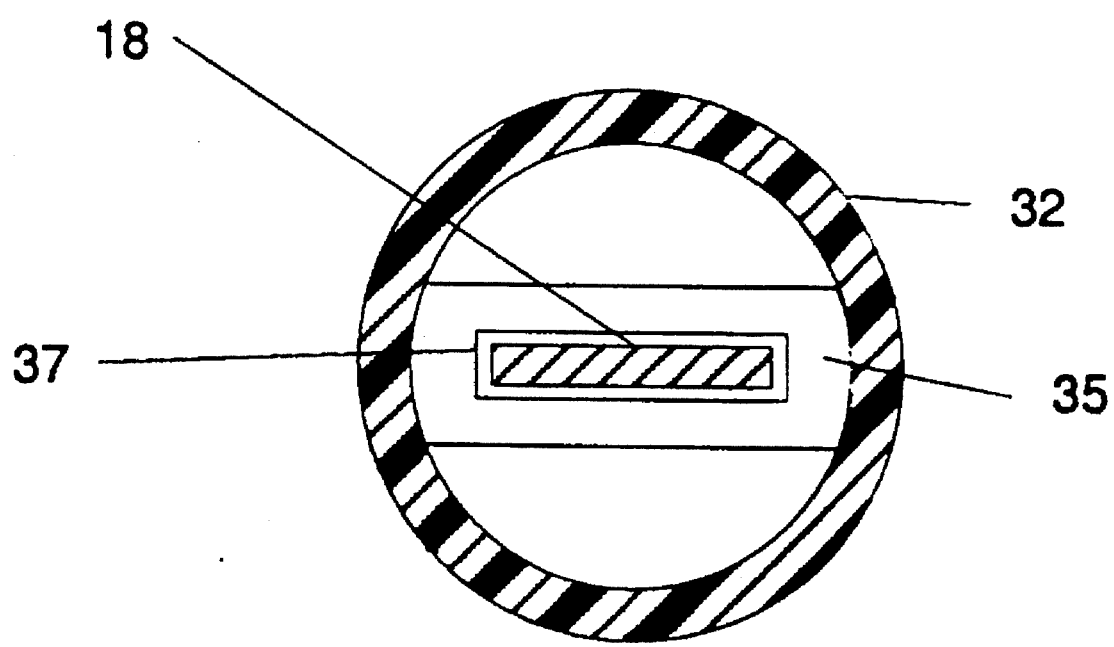
FIG. 7 is a horizontal cross-sectional view along line 7—7 of FIG. 6 illustrating means for supporting the adaptor relative to an electrode.

Another possibility is to manufacture the perforated tubular member 32 without the bottom 34, but from a semirigid material as in the embodiment of FIGS. 2 and 3. Again, its diameter will be slightly smaller than the width of the respective electrode, so that the tube must be compressed laterally to fit it over the electrode. Again, when the compression is removed, the tube will engage the electrode, as seen in FIG. 3. In this case the supports 35 and 36 shown in FIGS. 6 and 7 are not required. Of course, even with an integral bottom 34, the tube could be made flexible enough to be compressed sufficiently to be slipped onto electrode 18. In this third embodiment, the user can not very well himself change the dimensions of the adaptor as it was possible in the previous two embodiments, but he may still adjust the current by installing a tube with larger (or more) or smaller (or fewer) perforations. The vendor, again, may recommend a particular tube suitable for most users with the available water supply.

In all embodiments, the material used for the insulating sleeve must be heat-resistant. Mylar, of the solid, moldable variety, or Teflon, could be used for the semi-rigid sleeve. For the elastic sleeve, an elastomer should be used, such as Neoprene, or any of the heat-resistant silicone rubbers.

For clarity's sake, in all of the above embodiments the invention is illustrated by using the simplest structure, i.e. the vaporizer has only two electrodes, an adaptor is placed on only one electrode, and the adaptor consists of only one piece of tubing. However, just as possible and feasible would be more complex structures, having more than two electrodes, having an adaptor on more than one electrode, or having an adaptor composed of more than one piece of tubing. Combinations of features are also possible, e.g. the adaptor of the second embodiment could be provided also with perforations of the type shown in FIG. 6. Evidently, other obvious alternatives will be apparent to those skilled in the art. Accordingly, it is intended to embrace all such alternatives as fall within the spirit of the invention and the broad scope of the appended claims.

Also, for clarity's sake, in the disclosure and claims, the term "to adjust the adapter sleeve" means a one-time or occasional change of its length while the vaporizer is not operating, as clearly distinct from any continual variation during the operation of the device.

Similarly, the term "elastic" as applied to the sleeve means that its material is an elastomer and therefore easily stretchable and thereafter will tend to resume its former shape, as opposed to an only flexible, but not stretchable material.

What is claimed is:

1. A household vaporizer, having a reservoir holding water or a vaporizable aqueous solution, a vaporization chamber suspended from the top of the reservoir into the liquid, the chamber having a cap with a steam outlet at the top and a liquid inlet at its bottom, at least two flat or slightly curved electrodes supported by the cap and extending into the liquid in the chamber and means for connecting the electrodes to a household current source;

the improvement comprising:

replaceable adaptor means for limiting and controlling the current flow between the electrodes, said adaptor means comprising a deformable tubular or sleeve-like insulating member surrounding at least one electrode within said chamber and limiting the current flow through the liquid, the top end of the insulating member protruding above the surface of the liquid, the insulating member being made of a semi-rigid insulating material, and having an inside diameter slightly smaller than the width of the electrode requiring a slight lateral deformation to be fitted over the electrode, the insulating member being thus positioned in a substantially immovable relation with respect to the associated electrode and held on that electrode only by friction and a slight pressure between the insulating member and the electrode so that the member is easily replaceable by the user and adjustable as to its length in order to adjust the current flow between the electrodes to a desired value dependent on the hardness of the water supply.

2. A vaporizer as defined in claim 1 in which the tubular insulating member consists of several coaxial sections.

3. A household vaporizer having a reservoir holding water or a vaporizable aqueous solution, a vaporization chamber suspended from the top of the reservoir into the liquid, the chamber having a cap with a steam outlet at the top and a liquid inlet at its bottom, at least two flat or slightly curved electrodes supported by the cap and extending into the liquid in the chamber, and means for connecting the electrodes to a household current source:

the improvement comprising:

replaceable adaptor means for limiting and controlling the current flow between the electrodes, said adaptor means comprising an elastic sleeve-like insulating member tightly surrounding an upper portion of at least one electrode, leaving the lower portion of the electrode bare and free for current conduction, the elastic sleeve being sufficiently elastic to permit its lower end to be stretched peripherally outwardly and then lifted up to turn the sleeve onto itself or lowered again, thus permitting the user to easily adjust the effective length of the sleeve in order to adjust the current flow between the electrodes to a desired value dependent on the hardness of the water supply. "Also, for clarity's sake, in the disclosure and claims, the term to adjust the adapter sleeve means a one-time or occasional change of its length while the vaporizer is not operating, as clearly distinct from any continual variation during the operation of the device." and "Similarly, the term 'elastic' as applied to the sleeve means that its material is an elastomer and therefore easily stretchable and thereafter will tend to resume its former shape, as opposed to an only flexible, but not stretchable material."

* * * * *